Oct. 20, 1970     C. E. MUELLER ET AL     3,535,164

ELECTROLYTE FILTERED SEAWATER BATTERY

Filed May 10, 1968

INVENTORS
Carl E. Mueller
Frederic M. Bowers
Robert G. Jacobs

BY J. O. Tresansky

ATTORNEY

United States Patent Office 3,535,164
Patented Oct. 20, 1970

3,535,164
ELECTROLYTE FILTERED SEAWATER BATTERY
Carl E. Mueller, Rockville, Frederic M. Bowers, Silver Spring, and Robert G. Jacobs, Adelphi, Md., assignors to the United States of America as represented by the Secretary of the Navy
Filed May 10, 1968, Ser. No. 728,153
Int. Cl. H01m 11/00
U.S. Cl. 136—161                                    7 Claims

ABSTRACT OF THE DISCLOSURE

A seawater battery containing a filter for preventing sludging at the negative cells by removing magnesium ions in the electrolyte either by precipitation or a complexing reaction.

BACKGROUND OF THE INVENTION

This invention generally relates to seawater batteries and more particularly to an electrolyte filtering seawater battery and to a method of electrolyte filtering. Seawater batteries operate using seawater as an electrolyte because this water contains salts to the extent of ¾% to 4½% by weight of water, necessary for the production of electrical power to be supplied such devices as torpedoes, sonobuoys and life saving equipment. However, one of the components of the salts, magnesium, is also a source of a problem by which the capacity and life of the battery is diminished. It has been observed that the magnesium ion reacts with the hydroxide ions to form magnesium hydroxide, which is substantially insoluble in water, near the cells adjacent to the negative terminal of the battery. This precipitate, which exists largely as a sludge, clogs the inlet ports of these cells and also fills the space between the electrodes thus reducing the capacity and life of battery operation.

SUMMARY OF THE INVENTION

Accordingly, it is an object of the invention to provide a seawater battery having an increased life and capacity.

Another object of this invention is to provide a method to prevent sludging in a seawater battery.

Briefly, in accordance with one embodiment of this invention, these and other objects are attained by providing a seawater battery with a filter of thallous fluoride (TlF) or disodium ethylenediaminetetraacetate (disodium EDTA) through which the electrolyte flows before entering the cells of the battery.

BRIEF DESCRIPTION OF THE DRAWING

A more complete appreciation of the invention and many attendant advantages thereof will be readily appreciated as the same becomes better understood by reference to the following detailed description when considered in connection with the accompanying drawings wherein.

DESCRIPTION OF THE PREFERRED EMBODIMENTS

Figure 1:
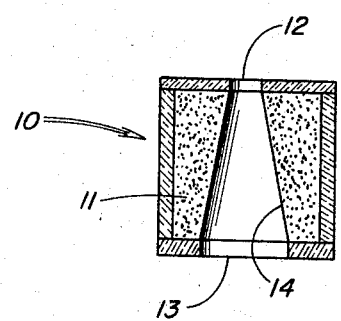
FIG. 1 is a cross sectional view of the chemical filter.
Figure 2:
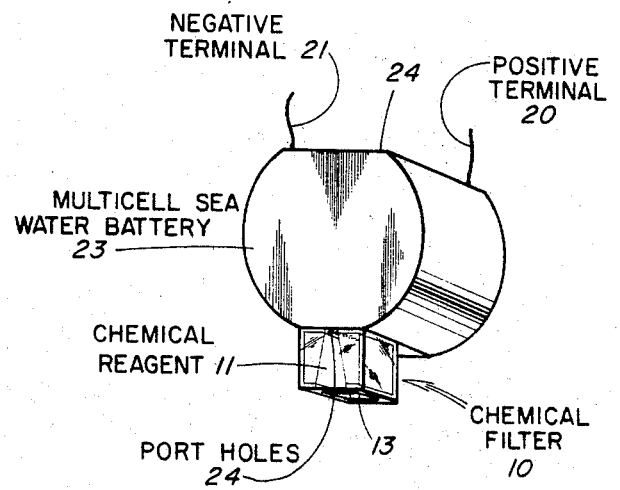
FIG. 2 is a perspective view of the filter attached to a multicell seawater battery.

The filter in which the present invention is embodied is shown in FIGS. 1 and 2 and comprises a rectangular housing 10 having an opening in the upper face 12 and in the lower face 13 so that the sea is able to flow through the filter. Inside the housing 10 is located the chemical reagent 11 which the water contacts as it flows from inlet 13 to outlet 12. An optional feature is a water permeable cover layer 14 which may be placed over the chemical reagent 11.

FIG. 2 shows the filter operationally attached to a conventional multicell seawater battery 23, having a positive terminal 20 and a negative 21 terminal. The upper outlet 12 set forth in FIG. 1 is positioned over lower port holes 24 of the battery, each individual cell having two port holes, one on the top and one on the bottom.

Figure 3:
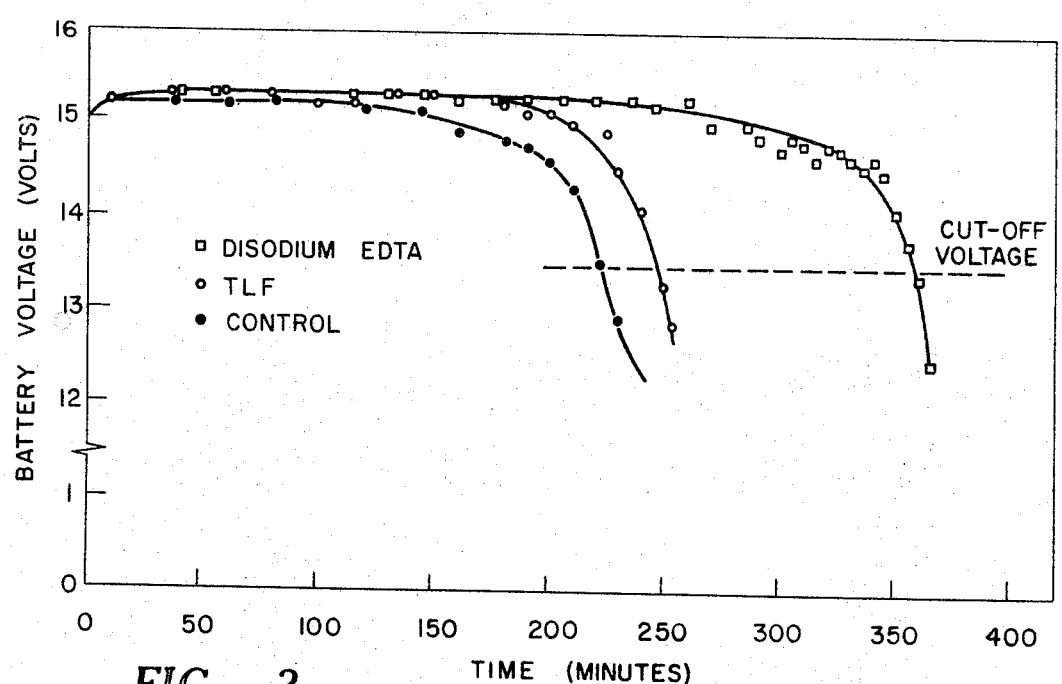
FIG. 3 is a graph of the time variation of capacity of a conventional seawater battery using a particular filter.

FIG. 3 is a time plot of voltage of a conventional 10 cell silver chloride/magnesium seawater battery for different filters and a control when discharged at a constant current of 150 milliamperes.

An actual battery used in testing the effectiveness of the various filters according to this invention is a ten cell silver chloride/magnesium seawater battery, which proved to be an effective power source for sonobuoys. Although this battery introduces magnesium ions into the water due to the depleting of the magnesium electrode these magnesium ions in reacting with the hydroxide form a fine white granular precipitate, which is readily flushed from the battery, and not the objectionable sludge which clogs up the port holes.

The invention is illustrated by the following examples but is not intended to be limited thereby.

EXAMPLE I

A filter was made by taking some TlF powder and compressing it into a cylindrical pill 1.03 cm. long and 0.95 cm. in diameter. The pill was wrapped with clear cellophane to prevent the outer surface from dissolving. Through the center of the pill a 0.18 cm. diameter hole was drilled. The pill was then glued over the inlet port of the negative cell of a single celled silver chloride/magnesium battery so that the seawater electrolyte had to pass through the pill before entering the negative electrode of the cell. When the battery was discharged only a small amount of flocculent hydroxy precipitate was observed although the test was run up to seven hours.

EXAMPLE II

The TlF filter was fabricated by compressing the powder into the configuration shown in FIG. 1, and gluing the formed block into a four-sided lucite (plastic) case. A protective cellophane cover was not placed over the TlF and some small strings of precipitate formed on its surface but it did not interfere with the operation of the battery. The case has an upper opening large enough to encompass just the inlet ports of the five cells adjacent to the negative electrode of the ten celled battery and also a lower opening equal to or greater in width to the upper one to admit the seawater to battery. Thus, the seawater electrolyte came in contact with the TlF before entering the five most negative cells.

EXAMPLE III

In this case, about 5 grams of disodium EDTA was wrapped in thin non-woven Dynel paper (a synthetic fiber made from acrylonitrile and vinyl chloride: "tea bag" paper) and suspended near the inlet port of the negative cell used in Example I. This approach was used because this reagent could not be compressed into a usable configuration.

EXAMPLE IV

The filter in this case resembled that of Example II except, since disodium EDTA could not be compressed, the loose crystalline salt was placed within the case and a Dynel paper of .001 inch thickness was used to enclose the loose salt within the case. Thus, the reagent was physically contained, but the ions were free to migrate through the thin paper and react with magnesium ions in the seawater prior to its entering the five cells adjacent to the negative electrode. Again it was observed that very little of the flocculent type precipitate, also referred to as sludge, was formed during the discharge.

The filters of Examples II and IV were applied to a conventional ten cell silver chloride/magnesium battery so that the seawater was filtered before entering the five most negative cells. The seawater in which the tests were run came from the Gulf Stream and contained essentially four major ions, sodium, magnesium, chloride and sulfate, the total salt concentration being approximately 3.5% by weight. The battery was then discharged at a constant current of 150 milliamperes and the voltage measured over periods of time. The results are set forth in FIG. 3 which indicate that an improvement of 12–45% in battery capacity was obtained by using a filter. Experimentally, the filter made from disodium EDTA proved the most efficient.

Various modifications can be made in the present invention without departing from the spirit or scope thereof, the only limitations being as defined in the appended claims.

What is claimed as new and desired to be secured by Letters Patent of the United States is:

1. In a battery activated by a moving stream of sea water electrolyte and having positive and negative electrodes, in combination, chemical filter means positioned adjacent to the inlet of said electrolyte to prevent magnesium ions in said electrolyte from reacting with hydroxide ions to form a sludge.

2. A battery according to claim 1 wherein said chemical filter means is formed of a material taken from the group consisting of thallous fluoride and disodium ethylenediaminetetraacetate.

3. In a multicell silver chloride/magnesium battery activated by a moving stream of sea water electrolyte and having positive and negative electrodes, in combination, filter means comprising compacted thallous fluoride positioned at the inlet of said battery adjacent to the negative electrode.

4. In a multicell silver chloride/magnesium battery activated by a moving stream of sea water electrolyte and having positive and negative electrodes, in combination, filter means comprising disodium ethylenediaminetetraacetate and a water permeable cover layer positioned so the electrolyte flows through the cover layer and contacts the filter means before contacting the most negative electrodes.

5. A method for increasing the life of a seawater battery comprising the steps of filtering the seawater with a chemical compound taken from the group consisting of thallous fluoride and disodium ethylenediaminetetraacetate, and passing the filtered seawater through the battery adjacent the negative electrode.

6. A method according to claim 5 wherein the chemical compound is thallous fluoride.

7. A method according to claim 5 wherein the chemical compound is disodium ethylenediaminetetraacetate.

References Cited

UNITED STATES PATENTS

| | | | |
|---|---|---|---|
| 2,706,213 | 4/1955 | Lucas | 136—100 |
| 3,036,142 | 5/1962 | Goldenberg et al. | 136—100 |
| 3,258,366 | 6/1966 | Pasquale et al. | 136—100 |
| 3,415,688 | 12/1968 | Foucry | 136—100 XR |

WINSTON A. DOUGLAS, Primary Examiner

D. L. WALTON, Assistant Examiner

U.S. Cl X.R.

136—100, 159